US012668430B2

(12) United States Patent
Kimura et al.

(10) Patent No.: US 12,668,430 B2
(45) Date of Patent: Jun. 30, 2026

(54) ARTICLE TRANSPORT FACILITY

(71) Applicant: Daifuku Co., Ltd., Osaka (JP)

(72) Inventors: Kosuke Kimura, Hinocho (JP);
Daisuke Ogawa, Hinocho (JP); Yuya Hirao, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 79 days.

(21) Appl. No.: 18/664,393

(22) Filed: May 15, 2024

(65) Prior Publication Data

US 2024/0383689 A1     Nov. 21, 2024

(30) Foreign Application Priority Data

May 19, 2023    (JP) ................................. 2023-082931

(51) Int. Cl.
*B65G 17/12*        (2006.01)
*B65G 43/00*        (2006.01)
*H04W 48/20*        (2009.01)

(52) U.S. Cl.
CPC ............. *B65G 17/12* (2013.01); *B65G 43/00* (2013.01)

(58) Field of Classification Search
None
See application file for complete search history.

(56) References Cited

U.S. PATENT DOCUMENTS

| | | | | |
|---|---|---|---|---|
| 8,322,287 | B2 * | 12/2012 | Oguro | ................. H10P 72/3208 104/91 |
| 9,086,697 | B2 * | 7/2015 | Suzuki | ............. G05B 19/41895 |
| 10,196,214 | B2 * | 2/2019 | Motoori | ................. B65G 17/20 |
| 2013/0195588 | A1 * | 8/2013 | Shibata | ................... B66C 19/00 414/222.13 |
| 2017/0283182 | A1 * | 10/2017 | Maejima | .............. G05D 1/0289 |
| 2018/0224839 | A1 * | 8/2018 | Takahara | ......... G05B 19/41895 |
| 2022/0046509 | A1 | 2/2022 | Kitamura et al. | |

FOREIGN PATENT DOCUMENTS

| | | | |
|---|---|---|---|
| JP | 2014192577 A | * | 10/2014 |
| JP | 2020198563 A | | 12/2020 |
| WO | 2020066486 A1 | | 4/2020 |

* cited by examiner

*Primary Examiner* — Gene O Crawford
*Assistant Examiner* — Muhammad Awais
(74) *Attorney, Agent, or Firm* — The Webb Law Firm

(57)        ABSTRACT

An article transport facility includes a transport vehicle. The transport vehicle is configured to switch an access point of a connection destination while moving along a path to maintain a communicable state with a control device. In a case in which a communication intensity of radio waves between the transport vehicle and the access point is lower than a predetermined switching threshold value, the transport vehicle performs switching processing of switching the connection destination to another access point having a stronger communication intensity. The switching threshold value is set to different values in accordance with a movement condition of the transport vehicle.

4 Claims, 5 Drawing Sheets

| AREA | AVERAGE MOVEMENT SPEED | SWITCHING THRESHOLD VALUE |
|---|---|---|
| A1 | Va1 | X1 |
| A2 | Va2 | X2 |
| A3 | Va3 | X3 |

ARTICLE TRANSPORT FACILITY

CROSS-REFERENCE TO RELATED APPLICATION

This application claims priority to Japanese Patent Application No. 2023-082931 filed May 19, 2023, the disclosure of which is hereby incorporated by reference in its entirety.

BACKGROUND OF THE INVENTION

1. Field of the Invention

The present invention relates to an article transport facility including a transport vehicle configured to move along a prescribed path to transport an article, a control device configured to control the transport vehicle, and a plurality of access points, each of which configured to perform wireless communication with the transport vehicle.

2. Description of Related Art

For example, Japanese Patent Application Laid-Open No. 2014-192577 discloses an invention related to wireless communication. In the following, reference numerals shown in parentheses in the description of the related art are those of Japanese Patent Application Laid-Open No. 2014-192577.

In the invention disclosed in Japanese Patent Application Laid-Open No. 2014-192577, a wireless communication device mounted on a mobile terminal (2) as a moving body performs wireless communication with an access point (60). The wireless communication device includes a radio wave intensity detection unit (50) that detects a radio wave intensity (X1) in wireless communication with the access point (60) being connected, and determines whether the radio wave intensity (X1) is lower than a roaming threshold value (Xth) at a predetermined time interval. When it is determined that the radio wave intensity (X1) is lower than the roaming threshold value (Xth), roaming processing of switching the access point (60) of a connection destination is performed.

It is conceivable to apply such a wireless communication technique to an article transport facility in which wireless communication between a transport vehicle as a moving body and a control device is performed via an access point. However, as in the invention disclosed in Japanese Patent Application Laid-Open No. 2014-192577, in a case in which it is determined whether the radio wave intensity is lower than the roaming threshold value at a predetermined time interval, the roaming processing may not be able to be performed at an appropriate timing depending on a movement condition of the transport vehicle. For example, in a case in which the transport vehicle moves at a high speed, a distance to be moved in the same time is longer than that in a case in which the transport vehicle moves at a low speed. Since the transport vehicle moves at a high speed, if a distance to an access point being connected is significantly long, a connection state with an access point having a relatively weak communication intensity may be maintained. Maintaining the connection state with an inappropriate access point may be a factor causing communication failure.

SUMMARY OF THE INVENTION

In view of the above circumstances, there is a demand for realizing an article transport facility capable of easily maintaining a favorable communication state between the control device and the transport vehicle.

Techniques for solving the above problems are as follows. An article transport facility including a transport vehicle configured to move along a prescribed path to transport an article; a control device configured to control the transport vehicle; and a plurality of access points, each of which configured to perform wireless communication with the transport vehicle, in which the transport vehicle is configured to switch the access points of connection destinations while moving along the path and communicate with the control device, when a communication intensity of radio waves between the transport vehicle and the access point is lower than a predetermined switching threshold value, the transport vehicle performs switching processing of switching the connection destination to another access point having a stronger communication intensity, and the switching threshold value is set to different values in accordance with movement conditions of the transport vehicle.

According to the present configuration, the switching threshold value that is a reference for the transport vehicle to perform the switching processing (roaming processing) is set to different values in accordance with the movement conditions of the transport vehicle. Therefore, the switching threshold value is able to be set in accordance with the movement conditions of the transport vehicle. Therefore, according to the present configuration, it is easy to maintain a favorable communication state between the control device and the transport vehicle.

Further features and advantages of the technique according to the present disclosure will be apparent from the following exemplary and non-limiting description with reference to the accompanying drawings.

DESCRIPTION OF THE INVENTION

Hereinafter, embodiments of an article transport facility will be described with reference to the drawings.

Figure 1:
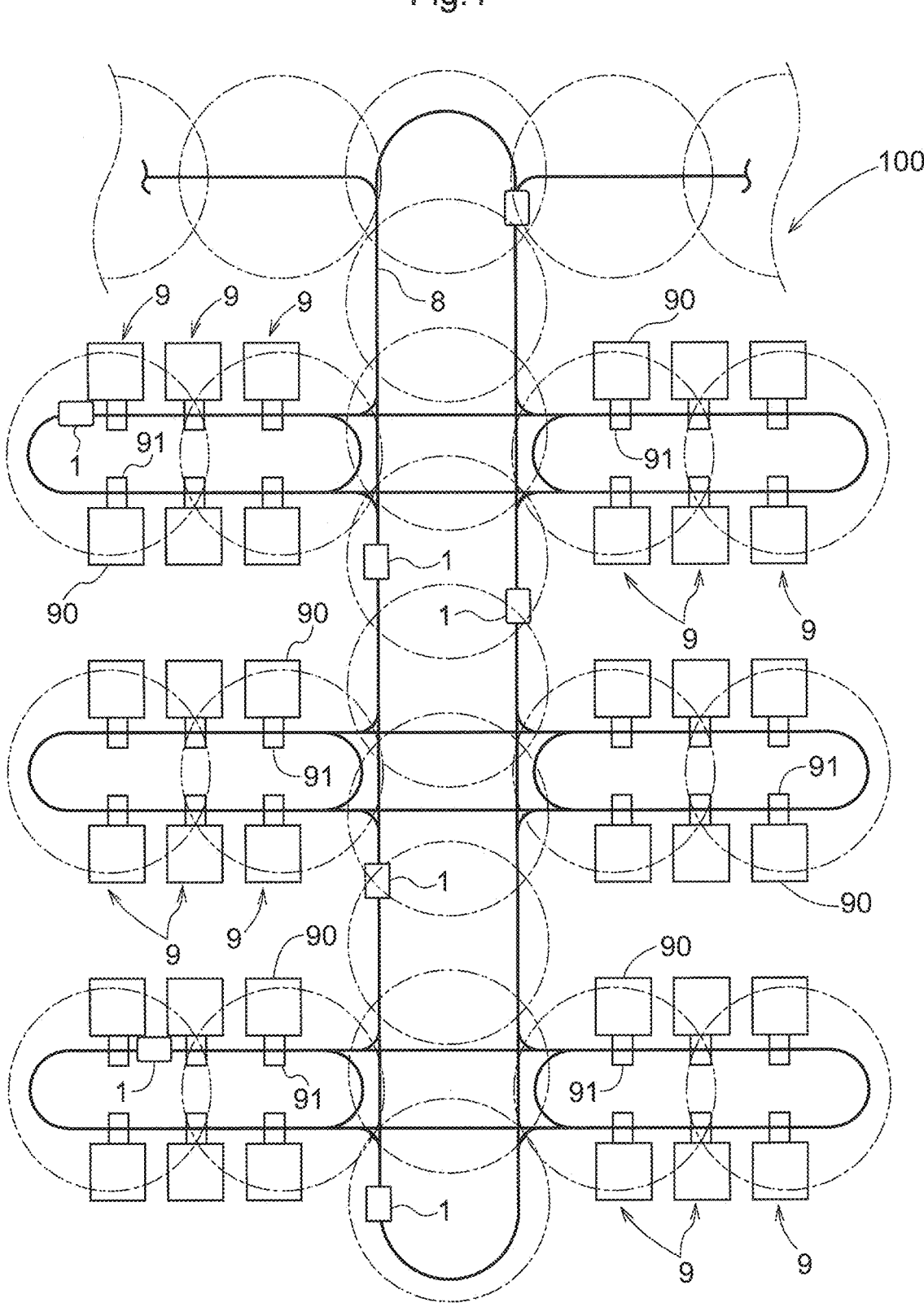
FIG. 1 is a plan view of an article transport facility.

As shown in FIG. 1, an article transport facility 100 includes transport vehicles 1 that move along a prescribed path 8 to transport articles (not shown), and a control device 2 (see FIG. 2 and the like) that controls the transport vehicles 1.

Figures 2, 3:
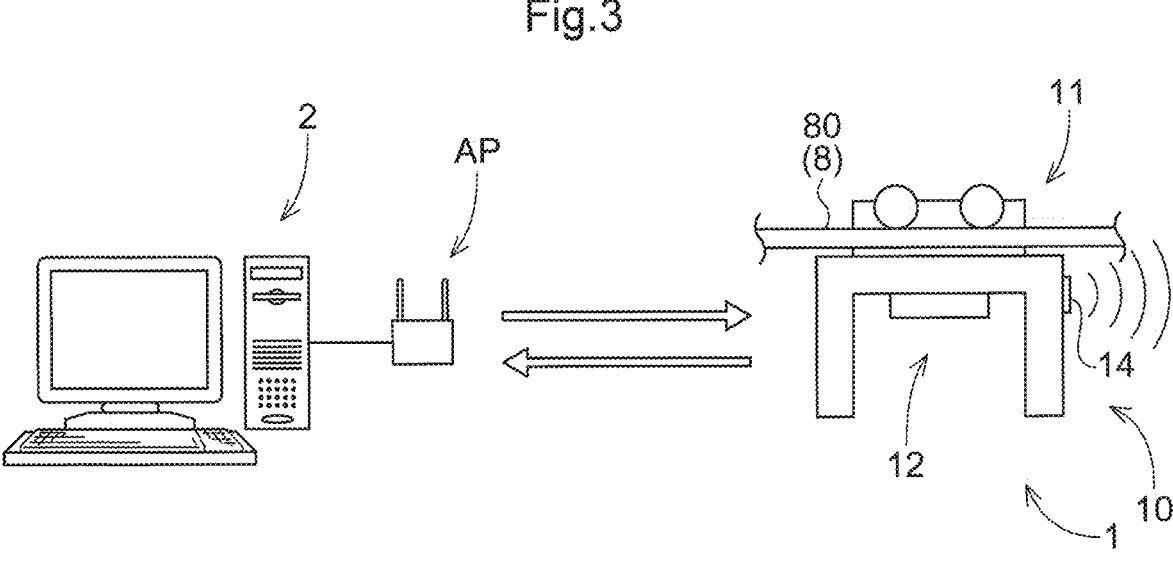
FIG. 2 is a control block diagram.
FIG. 3 is a conceptual diagram showing a communication configuration.

As shown in FIG. 3, in the present embodiment, the path 8 is configured by using a rail 80 installed near a ceiling. The transport vehicle 1 is configured as a so-called ceiling transport vehicle that travels while being supported by the rail 80. In the present embodiment, the transport vehicle 1 includes a body 10, a traveling portion 11 that travels along the rail 80, and a holder 12 that holds the article. The body 10 is configured to be capable of accommodating the holder 12 and the article held by the holder 12.

As shown in FIG. 1, in the present embodiment, the article transport facility 100 includes a plurality of transfer target locations 9 provided along the path 8. The transfer target location 9 is disposed below the path 8. In the present example, the path 8 includes an inter-bay and a plurality of intra-bays connected to the inter-bay. The plurality of transfer target locations 9 are provided in each intra-bay. The inter-bay is able to be referred to as a movement area in which the transport vehicle 1 mainly moves. The intra-bay is able to be referred to as a transfer area in which the transport vehicle 1 mainly performs a transferring operation of the article. The transport vehicle 1 is configured to transfer the article with the transfer target locations 9 by lifting and lowering the holder 12 (see FIG. 3).

In the present embodiment, the article transport facility 100 includes a plurality of transport vehicles 1. Each of the plurality of transport vehicles 1 is configured to receive a transport command from the control device 2 (see FIG. 2 and the like) and execute a task in accordance with the transport command. For example, the transport command includes information on a transport source and a transport destination of the article. The transport vehicle 1 that receives the transport command transports the article from the transport source to the transport destination. The transport source and the transport destination include the transfer target locations 9.

The articles handled by the article transport facility 100 are various. In the present example, the article transport facility 100 is used in a semiconductor manufacturing factory. Therefore, a substrate accommodating container (so-called front opening unified pod (FOUP)) that accommodates a substrate (a wafer, a panel, or the like), a reticle accommodating container (so-called reticle pod) that accommodates a reticle, and the like are the articles. In this case, the transport vehicle 1 transports the article, such as the substrate accommodating container or the reticle accommodating container, along the path 8 between respective steps.

In the present embodiment, the transfer target location 9 includes a processing device 90 that performs processing on the article and a transfer table 91 that is disposed adjacent to the processing device 90. In the present specification, the "processing on the article" means processing on an accommodated article (substrate or reticle) accommodated in the article as the accommodating container. The transport vehicle 1 receives the article on which the processing by the processing device 90 is finished from the transfer table 91 or delivers the article on which the processing by the processing device 90 is not finished to the transfer table 91. The processing device 90 performs, for example, various processing such as thin film formation, photolithography, and etching.

As shown in FIG. 2, the article transport facility 100 includes a plurality of access points AP (only one access point AP is shown in FIG. 2) that performs wireless communication with the transport vehicle 1, respectively. The access point AP is disposed at a center of each of a plurality of circular ranges shown in FIG. 1. These circular ranges indicate a guideline of a communicable range of each access point AP. However, this is only the guideline, and communication may be possible even outside the circular range.

The control device 2 and the transport vehicle 1 are configured to be communicable with each other in both directions via any of the plurality of access points AP.

Although details will be described later, the control device 2 is configured to repeatedly transmit the confirmation signal Sc to the transport vehicle 1 at a set cycle. The transport vehicle 1 is configured to transmit a reception signal Sr to the control device 2 in accordance with receiving of the confirmation signal Sc. With such a configuration, the control device 2 is able to periodically confirm a communication state with the transport vehicle 1.

In the present embodiment, the control device 2 includes a processing unit 20 and a storage unit 21. The processing unit 20 is configured by using, for example, an arithmetic processing device such as a central processing unit (CPU). The storage unit 21 is configured by using, for example, a storage device such as a random access memory (RAM) or a read only memory (ROM) that is able to be referred to by an arithmetic processing device. Then, each functional unit of the control device 2 functions by software (program) stored in the storage unit 21 or hardware such as an arithmetic circuit provided separately, or both thereof. The processing unit 20 provided in the control device 2 is operated as a computer that executes each program.

In the present embodiment, the transport vehicle 1 includes a transport vehicle control unit 13 and a wireless communication device 14. The transport vehicle control unit 13 is configured by using, for example, an arithmetic processing device such as a central processing unit (CPU). The wireless communication device 14 is configured to be communicable with the control device 2. In the present example, the wireless communication device 14 is configured to communicate with each of the plurality of access points AP in a wireless manner. Moreover, each of the plurality of access points AP is configured to communicate with the control device 2 in a wired manner. That is, the wireless communication device 14 is configured to be communicable with the control device 2 through any of the plurality of access points AP.

As shown in FIG. 3, the control device 2 is connected to an operation terminal. An operator is able to input various commands to the control device 2 by operating the operation terminal, and is also able to refer to a control situation by using the operation terminal.

The access point AP is configured by using a wireless access point device. The access point AP is configured to emit wireless radio waves. A communication intensity between the access point AP and the transport vehicle 1 is represented by a received signal strength indicator (RSSI). The unit is, for example, decibel milliwatt (dBm).

Figure 4:
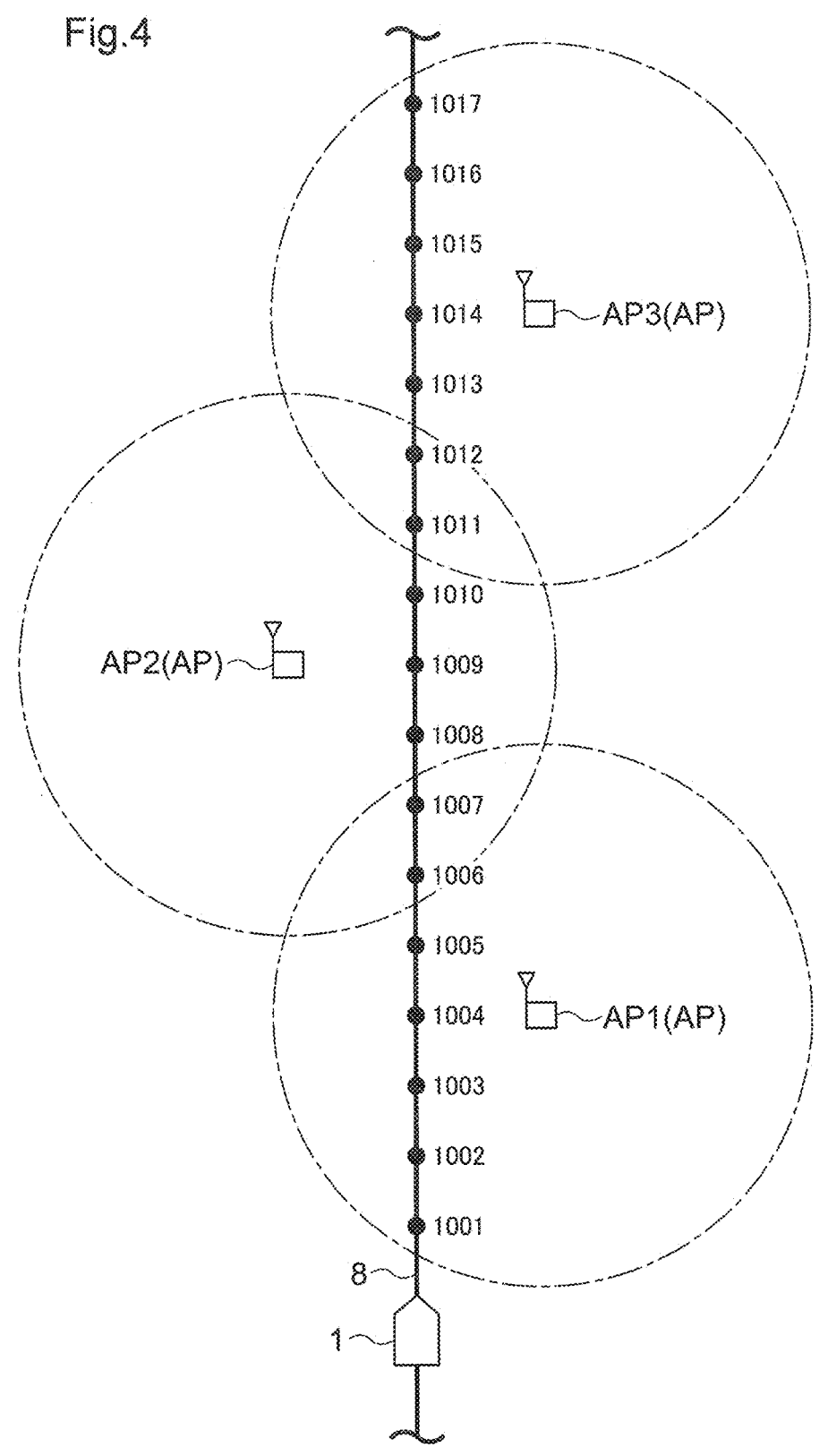
FIG. 4 is a diagram showing an example of switching of an access point.

As shown in FIG. 4, the transport vehicle 1 is configured to switch the access point AP of the connection destination while moving along the path 8 and communicate with the control device 2. In the example shown in FIG. 4, the first access point AP1, the second access point AP2, and the third access point AP3 are disposed along the path 8 so as to be adjacent to each other. In this case, the transport vehicle 1 switches the connection destination from the state of being connected to the first access point AP1 to the second access point AP2. Then, the transport vehicle 1 switches the connection destination from the state of being connected to the second access point AP2 to the third access point AP3. In this way, the transport vehicle 1 switches the access point AP of the connection destination while moving along the path 8.

In a case in which the communication intensity of the radio waves between the transport vehicle 1 and the access point AP is lower than a predetermined switching threshold value X, the transport vehicle 1 performs switching processing of switching the connection destination to another access point AP having a stronger communication intensity. As described above, the communication intensity of the radio waves is represented by the RSSI. The transport vehicle 1 performs the switching processing in a case in which the RSSI with the access point AP being connected is lower than the switching threshold value X.

Generally, as being closer to the access point AP, the communication intensity is stronger. As in the example shown in FIG. 4, a case in which the transport vehicle 1 moves along the path 8 from an address 1001 to an address 1017 will be considered. The communication intensity between the transport vehicle 1 and the first access point AP1 is the strongest in a state in which the transport vehicle 1 is at an address 1004 closest to the first access point AP1. After passing through the address 1004, since the transport vehicle 1 moves away from the first access point AP1, the communication intensity gradually decreases. In a case in which the communication intensity is lower than the switching threshold value X, the transport vehicle 1 performs the switching processing to switch the connection destination to another access point AP. In the example shown in the drawing, the transport vehicle 1 switches the connection destination to the second access point AP2. Similarly, the transport vehicle 1 also switches the connection destination from the second access point AP2 to the third access point AP3.

In the present embodiment, the transport vehicle 1 includes a communication intensity detection unit (not shown) that detects the communication intensity with the access point AP. The detection of the communication intensity by the communication intensity detection unit is performed at a certain detection cycle. This detection cycle may be a preset cycle or may be a cycle that inevitably occurs by executing a predetermined control flow.

The transport vehicle 1 executes the switching processing in a case in which the communication intensity is lower than the switching threshold value X based on the detection result by the communication intensity detection unit. That is, in the present embodiment, the switching processing is performed by the determination of the transport vehicle 1 itself.

The switching threshold value X is set to different values in accordance with a movement condition of the transport vehicle 1. The "movement condition" includes a movement speed V of the transport vehicle 1 and a condition related to the movement speed V. For example, the "movement condition" is that the movement speed V of the transport vehicle 1 is changed. In this case, the switching threshold value X is set to a value different in accordance with the movement speed V of the transport vehicle 1. In addition, the "movement condition" is that the transport vehicle 1 moves between a plurality of areas in the path 8. In this case, the switching threshold value X may be set to a value different in accordance with the average movement speed of the transport vehicles 1 set for each of the plurality of areas. In the example described below, the "movement condition" is that the transport vehicle 1 moves between a first area A1 and a second area A2.

In a case in which the "movement condition" is the movement speed V of the transport vehicle 1, the switching threshold value X is set to be higher in accordance with an increase in the movement speed V of the transport vehicle 1. As the movement speed V of the transport vehicle 1 is higher, the distance over which the transport vehicle 1 moves is longer during the detection cycle, that is, the cycle of detecting the communication intensity by the communication intensity detection unit. That is, a relative distance between the transport vehicle 1 and the access point AP connected to the transport vehicle 1 is increased from the time when the communication intensity is detected once to the time when the next communication intensity is detected. In this case, when the communication intensity is detected next, the communication intensity may be weakened to such an extent that appropriate communication is not able to be performed. However, by setting the switching threshold value X to be high in accordance with an increase in movement speed V, it is possible to prompt the transport vehicle 1 moving at a relatively high speed to perform the switching processing. Accordingly, the transport vehicle 1 is able to perform the switching processing to another access point AP before the communication intensity with the access point AP becomes excessively weak.

Although detailed illustration is omitted, the transport vehicle 1 includes a speed detection unit that detects a movement speed V of the transport vehicle 1, and executes switching processing based on a detection result of the speed detection unit. The speed detection unit is configured by using, for example, a rotary encoder. In the present embodiment, information on the movement speed V of the transport vehicle 1 is not transmitted to the control device 2. Therefore, in a configuration in which the control device 2 is not able to ascertain the movement speed V of the transport vehicle 1 and executes the switching processing based on the movement speed V of the transport vehicle 1, a command to execute the switching processing is not able to be transmitted from the control device 2 to the transport vehicle 1.

Figures 5, 6:
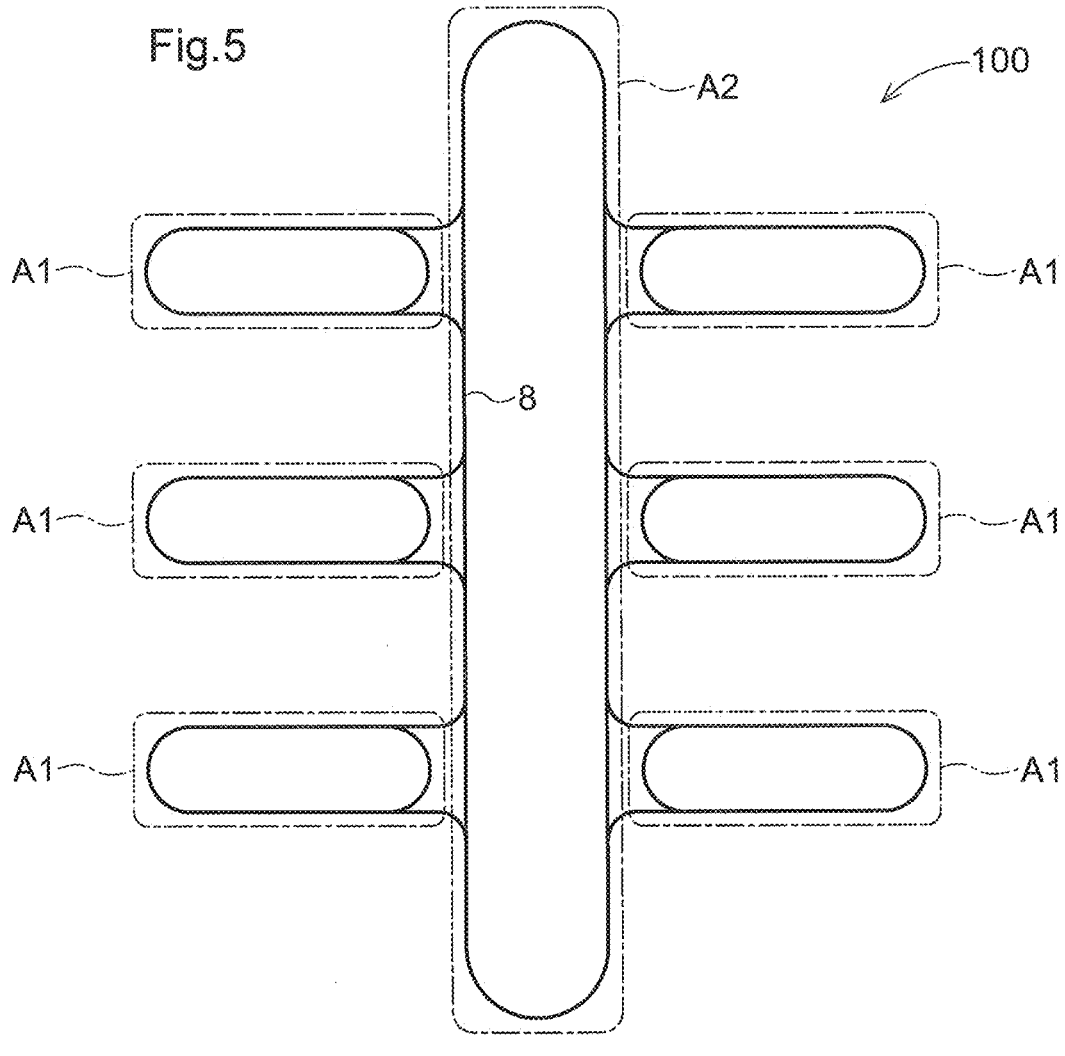
FIG. 5 is a diagram showing an example of a path divided into a plurality of areas.
FIG. 6 is a diagram showing a relationship between an average movement speed of a transport vehicle set for each area and a switching threshold value.

As shown in FIG. 5, in the present embodiment, at least the first area A1 and the second area A2 are set in the path 8. The second area A2 is an area in which an average movement speed Va of the transport vehicle 1 is higher than that in the first area A1. In the present example, the second area A2 is an area in which a limit speed of the transport vehicle 1 is set to be higher than that in the first area A1. As a result of setting the limit speed to be high in the second area A2, the average movement speed Va of the transport vehicle 1 moving in the second area A2 is increased.

In the present embodiment, each intra-bay in the path 8 is set as the first area A1. That is, the intra-bay, which is a transfer area for the transport vehicle 1 to mainly perform a transferring operation of the article, is set as the first area A1. In the intra-bay, since the transferring operation of the article by the transport vehicle 1 is performed, the limit speed is likely to be set relatively low. Therefore, a first average movement speed Va1 that is the average movement speed Va of the transport vehicle 1 moving in the first area A1 is lower than a second average movement speed Va2 that is the average movement speed Va of the transport vehicle 1 moving in the second area A2 (see FIG. 6).

In the present embodiment, an inter-bay in the path 8 is set as the second area A2. That is, the inter-bay, which is a movement area for the transport vehicle 1 to mainly move, is set as the second area A2. In the inter-bay, in principle, the transferring operation of the article by the transport vehicle 1 or the like is not performed, and the transport vehicle 1 mainly moves. Therefore, in the inter-bay, the limit speed is able to be set relatively high. Therefore, the second average movement speed Va2 of the transport vehicle 1 moving the second area A2 is higher than the first average movement speed Va1 of the transport vehicle 1 moving the first area A1 (see FIG. 6).

Although detailed illustration is omitted, an area (for example, a third area A3) in which the average movement speed Va of the transport vehicle 1 is higher than that in the second area A2 may be set. The third area A3 is an area in which the limit speed of the transport vehicle 1 is set to be higher than that in the second area A2. Therefore, a third average movement speed Va3 that is the average movement speed Va of the transport vehicle 1 moving in the third area A3 is higher than the second average movement speed Va2 of the transport vehicle 1 moving in the second area A2 (see FIG. 6).

As shown in FIG. 6, in the present embodiment, in each of the areas A1 to A3, the average movement speed Va (limit speed) of the transport vehicle 1 is determined, and the switching threshold value X is determined.

In the present embodiment, the second switching threshold value X2 of the transport vehicle 1 moving in the second area A2 is set to a value higher than the first switching threshold value X1 of the transport vehicle 1 moving in the first area A1. Accordingly, in the second area A2, the frequency of the switching processing of the access point AP by the transport vehicle 1 is likely to be high. In addition, in the present example, the third switching threshold value X3 of the transport vehicle 1 moving in the third area A3 is set to a value higher than the second switching threshold value X2 of the transport vehicle 1 moving in the second area A2. Accordingly, in the third area A3, the frequency of the switching processing of the access point AP by the transport vehicle 1 is likely to be further increased. With the configuration described above, it is difficult to maintain a connection state with a distant access point AP, and it is possible to prompt the transport vehicle 1 to connect to the access point AP suitable for the connection.

Although detailed illustration is omitted, the transport vehicle 1 is configured to travel while sequentially reading a plurality of information holding bodies installed along the path 8. Each information holding body holds address information indicating the installation of the information holding body. Therefore, the transport vehicle 1 is able to ascertain its current position by reading the information holding body. In the present embodiment, the transport vehicle 1 sets the switching threshold value X to the first switching threshold value X1 in a case in which the transport vehicle 1 is in the first area A1, and sets the switching threshold value X to the second switching threshold value X2 in a case in which the transport vehicle 1 is in the second area A2 based on the current position information of the transport vehicle 1. The current position information of the transport vehicle 1 is transmitted to the control device 2. Therefore, the control device 2 is able to ascertain the current position of the transport vehicle 1. Therefore, the control device 2 may transmit a setting command to set the switching threshold value X to the transport vehicle 1 based on the current position information of the transport vehicle 1. The transport vehicle 1 that has received the setting command from the control device 2 sets the switching threshold value X in accordance with the content of the setting command.

In the present embodiment, the transport vehicle 1 is further configured to perform switching processing in a predetermined set cycle. That is, in the present embodiment, the switching processing by the transport vehicle 1 is performed in a case in which the communication intensity of the radio waves between the transport vehicle 1 and the access point AP is lower than the switching threshold value X, and in a set cycle. Therefore, the transport vehicle 1 performs the switching processing even in a case in which the communication intensity is equal to or greater than the switching threshold value X, as long as the set cycle has come. In addition, the transport vehicle 1 performs the switching processing even in a case in which the set cycle does not come, as long as the communication intensity is lower than the switching threshold value X. With such a configuration, it is possible to further prompt the transport vehicle 1 to perform the switching processing.

In the present embodiment, the set cycle is changed in accordance with the movement condition. In the present example, the set cycle is changed to different cycles in a case in which the transport vehicle 1 is in the first area A1 and in a case in which the transport vehicle 1 is in the second area A2. As described above, it is preferable that since the second area A2 is an area in which the average movement speed Va of the transport vehicle 1 is higher than that in the first area A1, the frequency of the switching processing is increased. Therefore, in the present example, the set cycle in a case in which the transport vehicle 1 is in the second area A2 is changed to a cycle shorter than the set cycle in a case in which the transport vehicle 1 is in the first area A1. Accordingly, it is easy to prompt the switching processing in the second area A2.

In addition to the configuration described above or in addition to the configuration described above, the set cycle may be changed to a short period in accordance with an increase in movement speed of the transport vehicle 1. In this case, as the movement speed of the transport vehicle 1 is higher, the frequency of the switching processing by the transport vehicle 1 is higher. Therefore, it is easy to prompt the switching processing in a state in which the movement speed of the transport vehicle 1 is high.

Other Embodiments

Next, other embodiments will be described.

Figure 7:
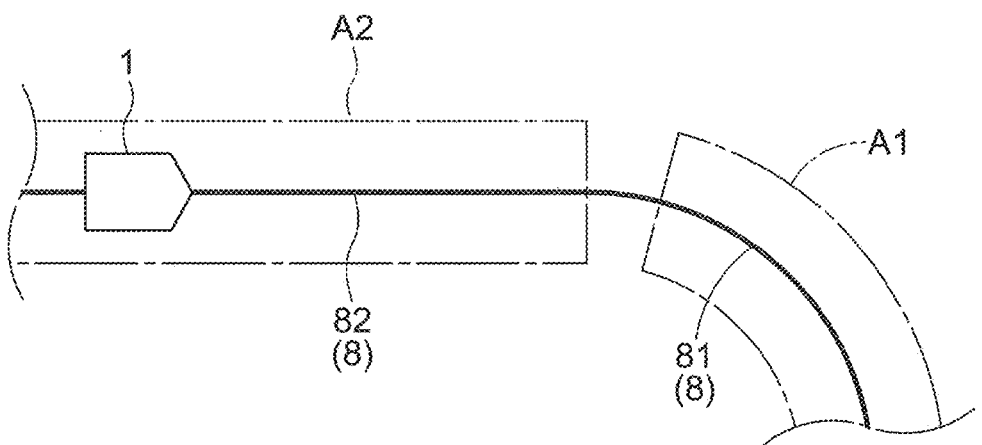
FIG. 7 is a diagram showing a path divided into a plurality of areas in another embodiment.

(1) In the embodiment described above, the example is described in which each intra-bay in the path 8 is the first area A1 in which the average movement speed Va of the transport vehicle 1 is relatively low, and each inter-bay in the path 8 is the second area A2 in which the average movement speed Va of the transport vehicle 1 is relatively high. That is, the example is described in which the area is divided into sections in a bay unit. However, the present invention is not limited to such an example, and the area may be divided in accordance with the shape of each part of the path 8. For example, as shown in FIG. 7, a curved path 81 in the path 8 may be the first area A1, and a straight line path 82 in the path 8 may be the second area A2. In the curved path 81, the average movement speed Va of the transport vehicle 1 is relatively low. In the straight line path 82, the average movement speed Va of the transport vehicle 1 is relatively high.

Figure 8:
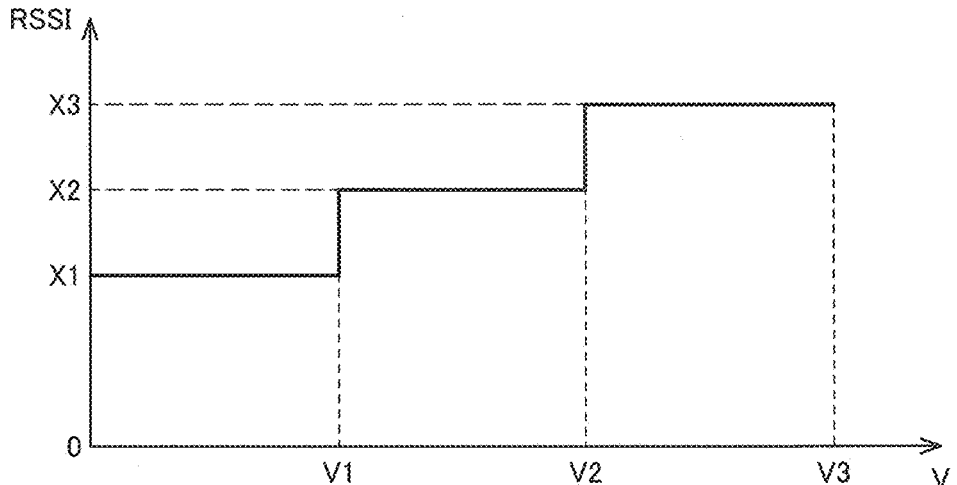
FIG. 8 is a diagram showing a relationship between a movement speed of a transport vehicle and a switching threshold value in another embodiment.

(2) In the embodiment described above, the example is described in which the switching threshold value X is set to be high in accordance with an increase in the movement speed V of the transport vehicle 1. The switching threshold value X may be set to continuously increase in accordance with the increase in the movement speed V of the transport vehicle 1, or may be set to stepwise increase as shown in FIG. 8. In the example shown in FIG. 8, in a case in which the movement speed V of the transport vehicle 1 is in a range from zero to the first speed V1, the switching threshold value X is set to the first switching threshold value X1. In a range where the movement speed V of the transport vehicle 1 is from the first speed V1 to the second speed V2 higher than the first speed V1, the switching threshold value X is set to the second switching threshold value X2 higher than the first switching threshold value X1. In a range where the movement speed V of the transport vehicle 1 is from the second speed V2 to the third speed V3 higher than the second speed V2, the switching threshold value X is set to the third switching threshold value X3 higher than the second switching threshold value X2.

(3) In the embodiment described above, the example is described in which the switching processing is performed by the determination of the transport vehicle 1 itself. However, the present invention is not limited to such an example and for example, the transport vehicle 1 may execute the switching processing in accordance with the switching command from the control device 2. In this case, as described above, the control device 2 can give a switching command to the transport vehicles 1 based on the current position information of the transport vehicles 1.

(4) In the embodiment described above, the example is described in which the path 8 is configured by using the rail 80 installed near the ceiling, and the transport vehicle 1 is configured as the ceiling transport vehicle that travels while being supported by the rail 80. However, the present invention is not limited to such an example, and the transport vehicle 1 may be configured as a floor surface transport vehicle that travels on a floor surface. In this case, the path 8 may be configured by using a magnetic tape or the like provided along the floor surface, or may be virtually set along the floor surface.

(5) In addition, the configuration disclosed in the embodiment described above is able to be applied in combination with configurations disclosed in other embodiments as long as there is no contradiction. The embodiments disclosed in the present specification are merely exemplary in all respects with regard to other configurations. Therefore, various modifications are able to be made within a range not departing from the scope of the present disclosure.

SUMMARY OF PRESENT EMBODIMENT

A summary of the present embodiment will be described below.

An article transport facility including a transport vehicle configured to move along a prescribed path to transport an article; a control device configured to control the transport vehicle; and a plurality of access points, each of which configured to perform wireless communication with the transport vehicle, in which the transport vehicle is configured to switch the access points of connection destinations while moving along the path and communicate with the control device, when a communication intensity of radio waves between the transport vehicle and the access point is lower than a predetermined switching threshold value, the transport vehicle performs switching processing of switching the connection destination to another access point having a stronger communication intensity, and the switching threshold value is set to different values in accordance with movement conditions of the transport vehicle.

According to the present configuration, the switching threshold value that is a reference for the transport vehicle to perform the switching processing (roaming processing) is set to different values in accordance with the movement conditions of the transport vehicle. Therefore, the switching threshold value is able to be set in accordance with the movement conditions of the transport vehicle. Therefore, according to the present configuration, it is easy to maintain a favorable communication state between the control device and the transport vehicle.

It is preferable that at least the first area and the second area are set in the path, the second area is an area where the average movement speed of the transport vehicle is higher than that in the first area, the movement condition is that the transport vehicle moves between the first area and the second area, and the switching threshold value of the transport vehicle moving in the second area is set to a value higher than the switching threshold value of the transport vehicle moving in the first area.

According to the present configuration, in the second area where the average movement speed of the transport vehicles is higher than that in the first area, the switching threshold value is set to a relatively high value. Therefore, in the second area, the frequency of the switching processing of the access point by the transport vehicle is likely to be high. Therefore, according to the present configuration, it is difficult to maintain a connection state with a distant access point, and it is possible to prompt the transport vehicle to connect to the access point AP suitable for the connection.

It is preferable that the movement condition is a change in the movement speed of the transport vehicle, and the switching threshold value is set to be continuously or stepwise increased in accordance with an increase in the movement speed of the transport vehicle.

According to the present configuration, as the movement speed of the transport vehicle is higher, the switching threshold value is set to a higher value. Therefore, it is difficult to maintain the connection state with a distant access point, and it is possible to prompt the transport vehicle to connect to the access point suitable for the connection.

It is preferable that the transport vehicle is further configured to perform the switching processing in a predetermined set cycle, and the set cycle is changed in accordance with the movement condition.

According to the present configuration, the transport vehicle performs the switching processing at the set cycle in addition to a case in which the communication intensity of the radio waves with the access point is lower than the switching threshold value. The set cycle is changed in accordance with the movement condition. Therefore, for example, the set cycle is able to be changed to be shorter than a normal period depending on the movement condition, and as a result, the switching processing by the transport vehicle is able to be prompted. Therefore, according to the present configuration, it is easy to maintain a favorable communication state between the control device and the transport vehicle.

INDUSTRIAL APPLICABILITY

The technique according to the present disclosure is able to be used for an article transport facility including transport vehicles that move along a prescribed path to transport articles, a control device that controls the transport vehicle, and a plurality of access points that performs wireless communication with the transport vehicle, respectively.

What is claimed is:
1. An article transport facility, comprising:
a transport vehicle configured to move along a prescribed path to transport an article;
a control device configured to control the transport vehicle; and
a plurality of access points, each of which configured to perform wireless communication with the transport vehicle,
wherein the transport vehicle is configured to switch the access points of connection destinations while moving along the path and communicate with the control device, wherein when a communication intensity of radio waves between the transport vehicle and the access point is lower than a predetermined switching threshold value, the transport vehicle performs switching processing of switching the connection destination to another access point having a stronger communication intensity, wherein the switching threshold value is set to different values in accordance with movement conditions of the transport vehicle, wherein at least a first area and a second area are set in the path, wherein the second area is an area where an average movement speed of the transport vehicle is higher than that in the first area, wherein the movement condition is that the transport vehicle moves between the first area and the second area, and wherein the switching threshold value of the transport vehicle moving in the second area is set to a value higher than the switching threshold value of the transport vehicle moving in the first area.

2. The article transport facility according to claim 1, wherein:

the movement condition is a change in a movement speed of the transport vehicle, and the switching threshold value is set to be continuously or stepwise increased in accordance with an increase in the movement speed of the transport vehicle.

3. An article transport facility, comprising:

a transport vehicle configured to move along a prescribed path to transport an article;

a control device configured to control the transport vehicle; and a plurality of access points, each of which configured to perform wireless communication with the transport vehicle, wherein the transport vehicle is configured to switch the access points of connection destinations while moving along the path and communicate with the control device, wherein when a communication intensity of radio waves between the transport vehicle and the access point is lower than a predetermined switching threshold value, the transport vehicle performs switching processing of switching the connection destination to another access point having a stronger communication intensity, wherein the switching threshold value is set to different values in accordance with movement conditions of the transport vehicle, wherein the transport vehicle is further configured to perform the switching processing in a predetermined set cycle, and wherein the set cycle is changed in accordance with the movement condition.

4. The article transport facility according to claim 3, wherein:

the movement condition is a change in a movement speed of the transport vehicle, and the switching threshold value is set to be continuously or stepwise increased in accordance with an increase in the movement speed of the transport vehicle.

* * * * *